US008416869B2

(12) United States Patent
Lain et al.

(10) Patent No.: US 8,416,869 B2
(45) Date of Patent: Apr. 9, 2013

(54) PEAK-TO-AVERAGE POWER RATIO REDUCTION METHOD FOR ORTHOGONAL FREQUENCY DIVISION MULTIPLEXING SYSTEMS BASED ON PATH FINDING

(75) Inventors: Jenn-Kaie Lain, Yunlin County (TW); Shih-Wei Shiu, Yunlin County (TW)

(73) Assignee: National Yunlin University of Science and Technology, Douliu, Yunlin County (TW)

( * ) Notice: Subject to any disclaimer, the term of this patent is extended or adjusted under 35 U.S.C. 154(b) by 468 days.

(21) Appl. No.: 12/774,296

(22) Filed: May 5, 2010

(65) Prior Publication Data

US 2011/0274186 A1 Nov. 10, 2011

(51) Int. Cl.
*H04L 27/28* (2006.01)
(52) U.S. Cl.
USPC ........... 375/260; 375/295; 375/296; 375/259; 375/285; 375/297; 455/114.2; 455/114.3
(58) Field of Classification Search .................. 375/295, 375/296, 260, 259, 285, 297; 455/114.2, 455/114.3
See application file for complete search history.

(56) References Cited

U.S. PATENT DOCUMENTS

2006/0020394 A1* 1/2006 Dicke et al. ..................... 702/19
2008/0144074 A1* 6/2008 Lin ................................. 358/1.15
2012/0069769 A1* 3/2012 Lain et al. ...................... 370/254

OTHER PUBLICATIONS

Stefan H. Müller et al, *A Comparison of Peak Power Reduction Schemes for OFDM*, IEEE Global Telecommunications Conference, GLOBECOM '97, Nov. 1997, pp. 1-5, Phoenix, Arizona, USA.

* cited by examiner

*Primary Examiner* — Siu Lee
(74) *Attorney, Agent, or Firm* — Muncy, Geissler, Olds & Lowe, PLLC (57) ABSTRACT

In a peak-to-average power ratio (PAPR) reduction method for an orthogonal frequency division multiplexing (OFDM) system based on path finding, the method applied to the OFDM system uses an ant colony optimization (ACO) algorithm and a PTS to reduce a PAPR value, and an area of a computing circuit. In a simulated result, the method can reduce the PAPR effectively, and can be executed by a lower level of complexity of the computation. To solve a large matrix of the PTS, an ant colony optimization algorithm is used for calculating phase rotation vectors of a better quality effectively to achieve the effects of improving the performance, overcoming the high level of complexity of the computing circuit, and reducing the large area of the computing circuit.

6 Claims, 8 Drawing Sheets

|              | Sub-block 1 | Sub-block 2 | Sub-block 3 | Sub-block 4 |
|--------------|:-----------:|:-----------:|:-----------:|:-----------:|
| Angle Weight 1 | 0 | 0 | 0 | 0 |
| Angle Weight 2 | 0 | 0 | 0 | 0 |
| Angle Weight 3 | 0 | 0 | 0 | 0 |
| Angle Weight 4 | 0 | 0 | 0 | 0 |

Fig. 3A

|   | Sub-block 1 | Sub-block 2 | Sub-block 3 | Sub-block 4 |
|---|---|---|---|---|
| Angle Weight 1 | 0.941 | 0 | 0 | 0 |
| Angle Weight 2 | 0 | 0 | 0.941 | 0.941 |
| Angle Weight 3 | 0 | 0 | 0 | 0 |
| Angle Weight 4 | 0 | 0.941 | 0 | 0 |

Fig. 3B

|  | Sub-block 1 | Sub-block 2 | Sub-block 3 | Sub-block 4 |
|---|---|---|---|---|
| Angle Weight 1 | 0.941 | 0 | 0 | 0 |
| Angle Weight 2 | 0 | 0 | 0.941 | 0.877 |
| Angle Weight 3 | 0.936 | 0 | 0.936 | 0 |
| Angle Weight 4 | 0 | 1.877 | 0 | 0 |

Fig. 3C

|  | Sub-block 1 | Sub-block 2 | Sub-block 3 | Sub-block 4 |
|---|---|---|---|---|
| Angle Weight 1 | 1.873 | 0 | 0 | 0.932 |
| Angle Weight 2 | 0 | 0 | 0.941 | 1.877 |
| Angle Weight 3 | 0.936 | 0 | 0.936 | 0 |
| Angle Weight 4 | 0 | 1.877 | 0.932 | 0 |

PEAK-TO-AVERAGE POWER RATIO REDUCTION METHOD FOR ORTHOGONAL FREQUENCY DIVISION MULTIPLEXING SYSTEMS BASED ON PATH FINDING

FIELD OF THE INVENTION

The present invention relates to a peak-to-average power ratio (PAPR) reduction method, and more particularly to a PAPR reduction method that applies the concept finding the shortest path in an orthogonal frequency division multiplexing (OFDM) system.

BACKGROUND OF THE INVENTION

Orthogonal frequency division multiplexing (OFDM) transmission technique applied in high-speed wireless networks is very popular, and the OFDM transmission technique can resist frequency selective fading and interference between symbols effectively. The advantages of OFDM transmission technique that have made this technique popular in wireless systems are sometimes counterbalanced by one major problem of a very high peak-to-average power (PAPR), so that a power amplifier requires a very large linear operated area due to the high PAPR, and a serious signal distortion may result easily. Alternatively, a power amplifier with a relatively larger linear operated area is required. However, power amplifiers of this sort are generally high priced.

There are two main conventional methods of reducing the PAPR, respectively: a signal distortion technique and a distortionless PAPR reduction technique. The principle of the signal distortion technique attempts to reduce an amplitude of a sample node having a too-large signal power in order to achieve the PAPR reduction effect. For example, a clipping method directly restricts an input signal of a very large amplitude to be transmitted within a predetermined range of values. However, the signal amplitude is damaged easily, such that the signal spectra will be aliased to cause the issue of in-band distortions. On the other hand, the distortionless PAPR reduction technique does not require any signal distortion technique, and "A Comparison of Peak Power Reduction Schemes for OFDM" authored by S. H. Muller and J. B. Huber published in IEEE Global Telecommunications Conference, GLOBALCOM '97, Phoenix, Ariz., pp. 1-5, November 1997 discloses a partial transmit sequence (PTS) method, which is publicly accepted as one of the methods capable of reducing PAPR effectively. Since the PTS method involves linear operations, there will be no destructive interference to the signals of the OFDM transmission technique. Without considering noises, a receiving end can demodulate the signal completely. However, the PTS algorithm involves a high level of complexity and a huge computation capacity, and thus the PTS method is not cost-effective.

SUMMARY OF THE INVENTION

Therefore, it is a primary objective of the present invention to overcome the problems of an orthogonal frequency division multiplexing (OFDM) system having a high peak-to-average power ratio (PAPR) value and requiring the use of a high-priced power amplifier, and to lower the cost and avoid distortions produced during power amplifications.

To achieve the foregoing objective, the present invention improves the high level of complexity of computations performed by a partial transmit sequence (PTS) method and combines the PTS method with an ant colony optimization algorithm (ACO) to reduce the complexity and provide a more efficient computing method, so as to achieve the effects of simplifying the computing circuits and reducing the area for the computing circuit.

The present invention utilizes an ant colony simulated by a computer to solve the optimal path finding problem. The PTS method is applicable for the OFDM system to solve the problem of the high PAPR. However, the quantity of all possible phase rotation vectors of the PTS method is huge, and it is necessary to use a large quantity of circuit operators to find the solutions. Thus the present invention uses an ant algorithm of the ant colony system (ACS) to find the optimum in order to reduce the computation capacity of the circuit and the area of the circuit, and artificial ants of the present invention has the following characteristics:

(1) The time in the world of the artificial ants is discrete.
(2) The artificial ants have temporary memory.
(3) The amount of pheromone released by the artificial ants is constant.
(4) The artificial ants release pheromone uniformly according to the length of a path.
(5) The artificial ants can predict the length of each path in terms of a path transition probability.

The ants use the pheromone left on the path and the path transition probability to determine the optimal path and find the optimum, so as to reduce probability of finding a wrong solution. To overcome the problem of having a large quantity of possible solutions of the PTS method, the method adopted by the ants is used for minimizing the probability of finding a wrong solution, obtaining an optimum with the highest probability directly, avoiding a complicated computation that results in a large area of the computing circuit, and achieving high performance.

DETAILED DESCRIPTION OF THE PREFERRED EMBODIMENTS

The technical contents of the invention will now be described in more detail hereinafter with reference to the accompanying drawings that show various embodiments of the invention.

First of all, the description of partial transmit sequence (PTS) method is given below. Although the PTS method has good effects on peak-to-average power ratio (PAPR) reduction, yet it incurs a high level of complexity, and the basic concept of the PTS method is to divide the original orthogonal frequency division multiplexing (OFDM) signals into a plurality of sub-blocks, and then different angle weights are used for an angular rotation of each sub-block, such that the peak power can cause an offset of vectors according to the angular rotation to achieve the PAPR reduction effect. The main reason of producing a high level of complexity resides on the combination of a quantity of sub-blocks (i) and a quantity of angle weights (j), and they have an exponential relation with each other, and it is necessary to increase the quantity of sub-blocks (i) and the quantity of angle weights (j) for the PTS method to reduce the PAPR, and thus increasing the level of complexity of the computation. Obviously, the level of complexity for the angle finding by the PTS method requires improvements. Refer to Table 1 for the quantity of angle findings of the PTS method according to the quantity of the angle combination.

TABLE 1

Quantity of angle combination of PTS method

| Quantity of sub-blocks (i) | Quantity of angle weights (j) | Quantity of angle findings ($j^{i-1}$) |
|---|---|---|
| 2 | 4 | 4 |
| 2 | 8 | 8 |
| 4 | 4 | 64 |
| 4 | 8 | 512 |
| 8 | 2 | 128 |
| 8 | 4 | 16384 |

The technical characteristics of the present invention will become apparent with the detailed description of a preferred embodiment and the illustration of related drawings as follows.

Figure 1:
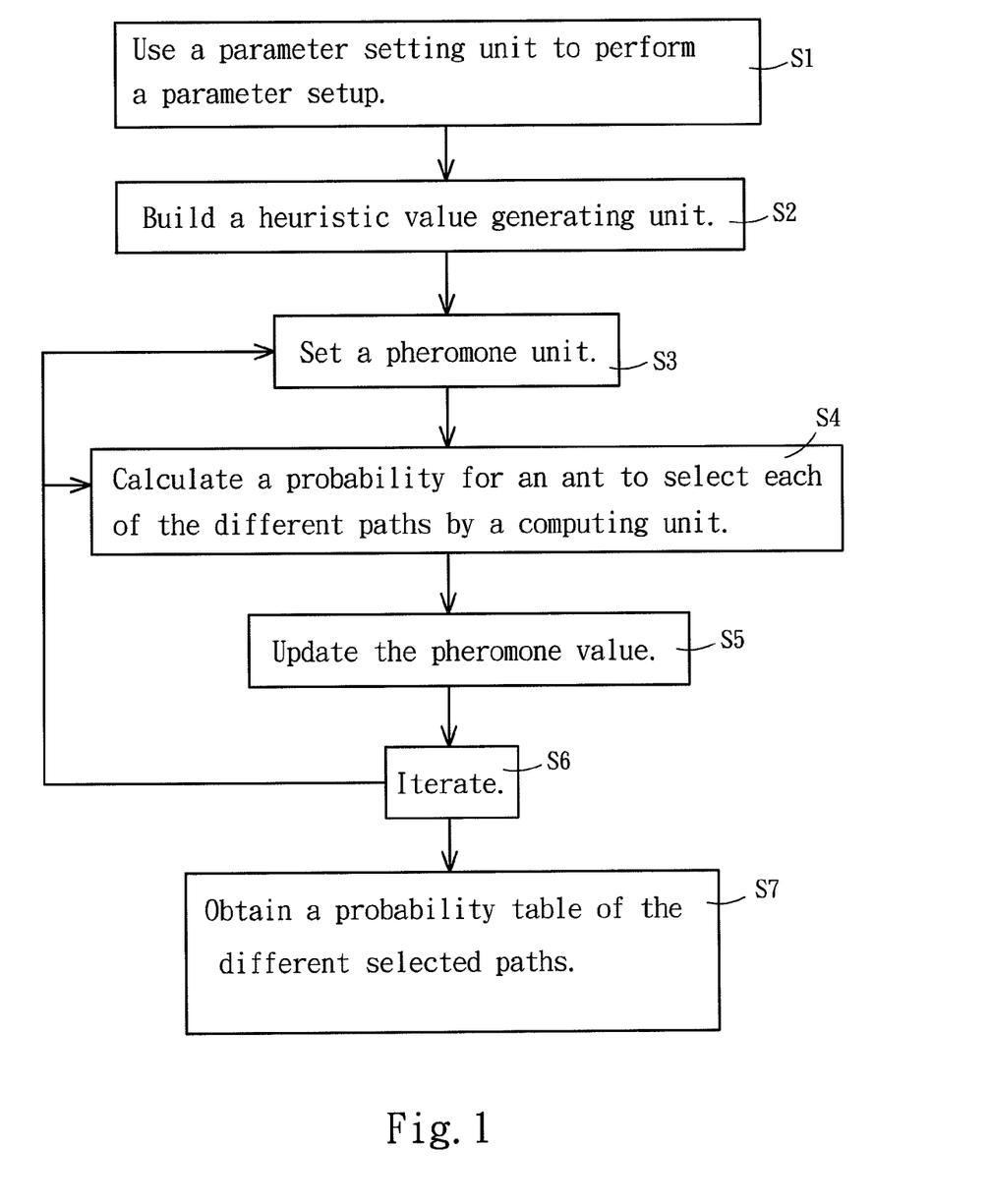
FIG. 1 is a flow chart of a preferred embodiment of the present invention.
Figure 2:
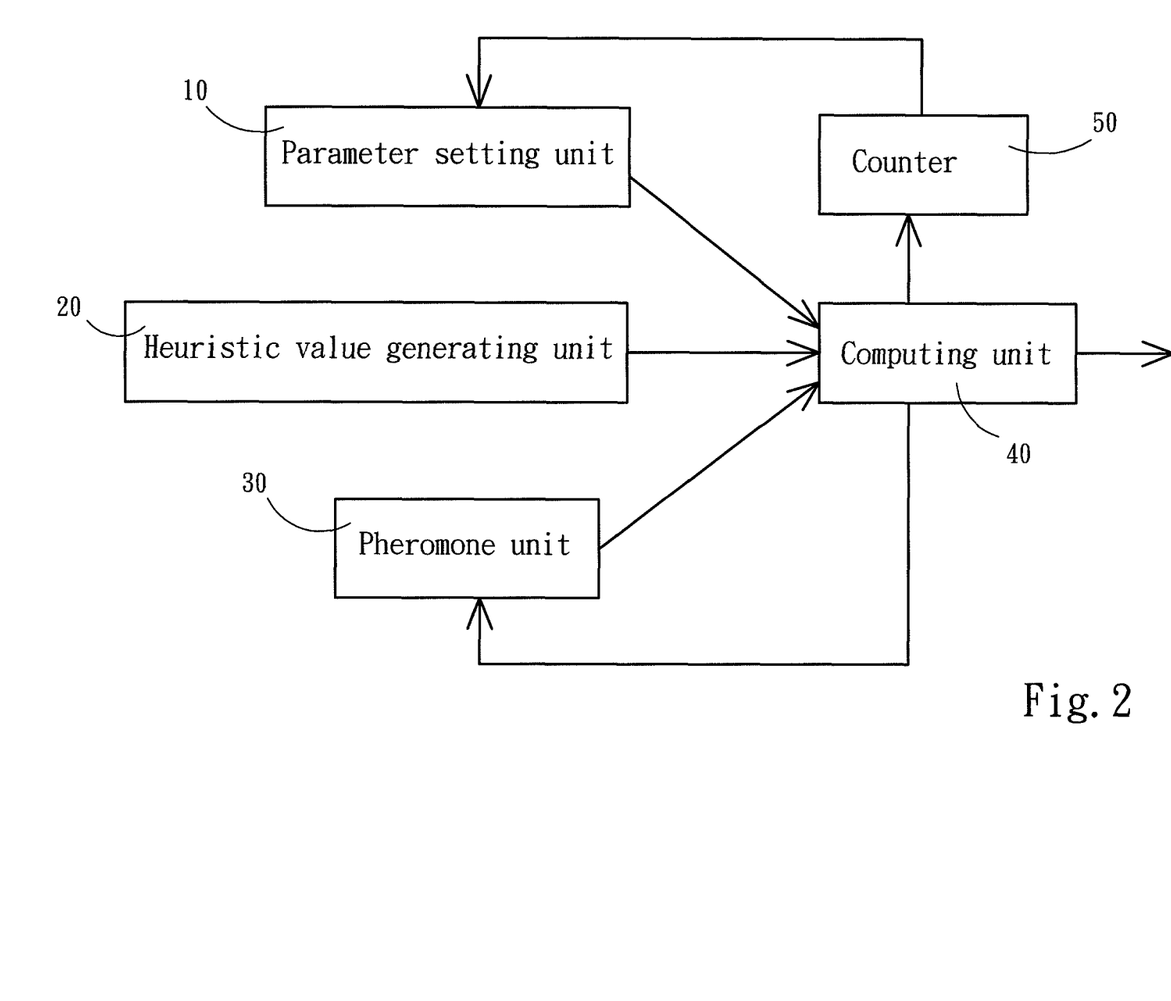
FIG. 2 is a schematic block diagram of a preferred embodiment of the present invention.

With reference to FIGS. 1 and 2 for a PAPR reduction method for an OFDM system based on path finding in accordance with the present invention, the method applied to the OFDM system uses an ant colony optimization algorithm together with a PTS method to reduce the PAPR value, and the ant colony optimization algorithm mainly uses the characteristics and behaviors of an ant searching for food to create the mathematical model, and interprets different solutions as different paths, and uses the characteristic of an ant leaving pheromone on a path to find the optimal path, so as to obtain an optimum and reduce the area of a computing circuit.

The method comprises the steps of:

S1: using a parameter setting unit 10 to carry out a parameter setup to set the quantity of sub-blocks (i), the quantity of angle weights (j), the quantity of ants (k) and the number of iterations (t), wherein the quantity of sub-blocks (i) and the quantity of angle weights (j) are combined to form a matrix, and the matrix used in the ant colony optimization algorithm represents different selected paths;

S2: building a heuristic value generating unit 20, and the heuristic value generating unit 20 produces a heuristic value ($\eta_{ij}$), according to a peak power f(b), wherein this embodiment adopts a uniform distribution to randomly generate 200 sets of solutions (R) for calculating the peak power f (b), η and uses Equation (b) to calculate the heuristic value ($\eta_{ij}$):

$$\eta_{ij}=1/\exp(f(b)) \quad (b)$$

and then performing a sort process and using the top ten sets of solutions to generate a table of heuristic values;

S3: setting a pheromone unit 30 and setting a pheromone value ($\tau_{ij}$), wherein the pheromone value ($\tau_{ij}$) represents a path selection rate, and the initial pheromone value ($\tau_{ij}$) is assumed to be the same since the ant has not passed through any path at the beginning;

S4: calculating the probability $P_{ij}(t)$ for an ant to select each of the different selected paths through a computing unit 40, wherein the computing unit 40 performs a calculation according to Equation (a):

$$P_{ij}(t) = \frac{[\tau_{ij}(t)]^\alpha \times [\eta_{ij}]^\beta}{\sum_{l \in allowed_k}[\tau_{il}(t)]^\alpha \times [\eta_{il}]^\beta} \quad (a)$$

where, λ represents the angle weight that the $k^{th}$ ant has not selected yet, α and β represent the values for adjusting the specific weights of the pheromone value ($\tau_{ij}$) and the heuristic value ($\eta_{ij}$) respectively, and the pheromone value ($\tau_{ij}$) is updated by Equation (c):

$$\tau_{ij}(t+n)=\rho \times \tau_{ij}(t)+\Delta\tau_{ij} \quad (c),$$

where, ρ is a decay rate of the pheromone value ($\tau_{ij}$), $\tau_{ij}$ is a quantity of pheromone of all ants remained on the same path during the period that the iteration is performed from t to t+n, and the setting condition of the decay rate of the pheromone value is $0 \leq \rho \leq 1$;

S5: updating the pheromone value ($\tau_{ij}$);

S6: repeating Steps S3 and S4 until the number of iterations is finished; and

S7: obtaining a probability table of the different selected paths, and avoiding any impossible path.

With reference to FIG. 2 for a schematic block diagram of the present invention, the parameter setting unit 10, the heuristic value generating unit 20 and the pheromone unit 30 are coupled to the computing unit 40 separately, and the set parameters and generated data are inputted into the computing unit 40 and provided for the use and calculation by the computing unit 40, and the computing unit 40 will return the calculated pheromone value ($\tau_{ij}$) to the pheromone unit 30 for updating the pheromone value ($\tau_{ij}$), and a counter 50 is provided for counting the number of times of returning the calculated value to the parameter setting unit 10 for the update.

Further, the heuristic value ($\eta_{ij}$) represents a value that the path is expected to be selected by the ant. Thus the heuristic value ($\eta_{ij}$) will affect the probability for the ant to select the path. If the ant passed through the path with a larger heuristic value ($\eta_{ij}$), the probability for the ant to select the path is greater. On the other hand, a smaller heuristic value ($\eta_{ij}$) implies that the probability for the ant to select the path becomes smaller. In general, the heuristic value ($\eta_{ij}$) is set according to the reciprocal of distance, and the heuristic value ($\eta_{ij}$) in this embodiment is related to the reciprocal of the peak power f(b) as shown in Equation (b). In addition, each ant possesses the same quantity of pheromone, such that the value of $\Delta\tau_{ij}$ is related to the path. In other words, the longer the total path passed by the ant, the less is the quantity of pheromone left by the ant on the path. Therefore, a higher pheromone value is generally found in a shorter path.

Figure 3A:
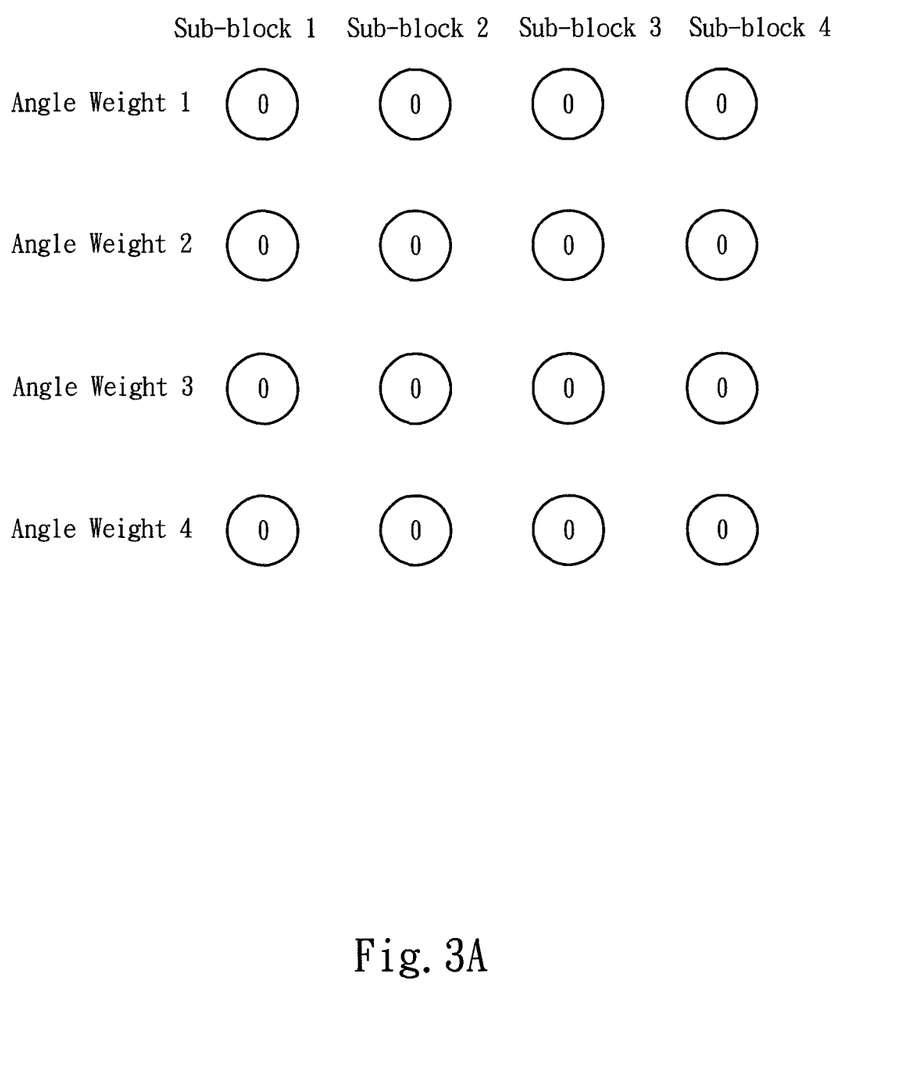
FIG. 3A is a schematic view of initializing heuristic values in accordance with a preferred embodiment of the present invention.
Figure 3B:
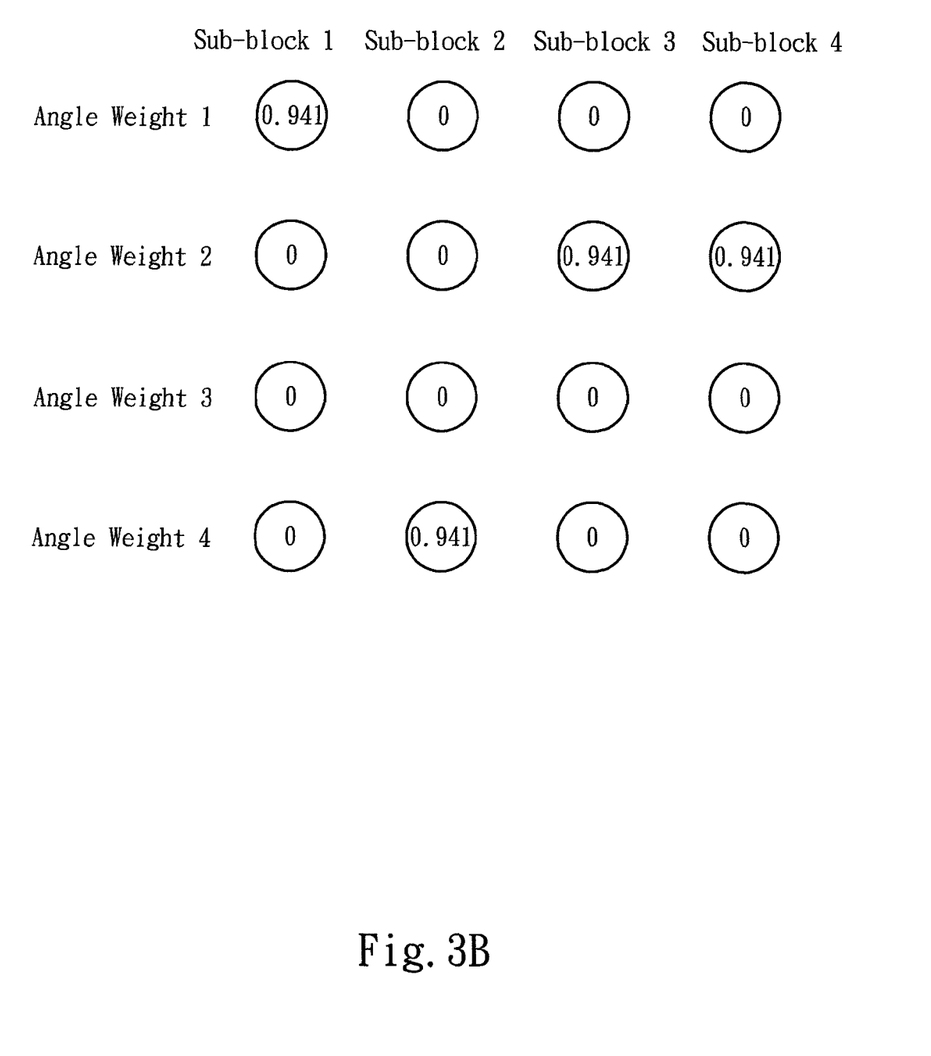
FIG. 3B is a schematic view of a first time of updating heuristic values in accordance with a preferred embodiment of the present invention.
Figure 3C:
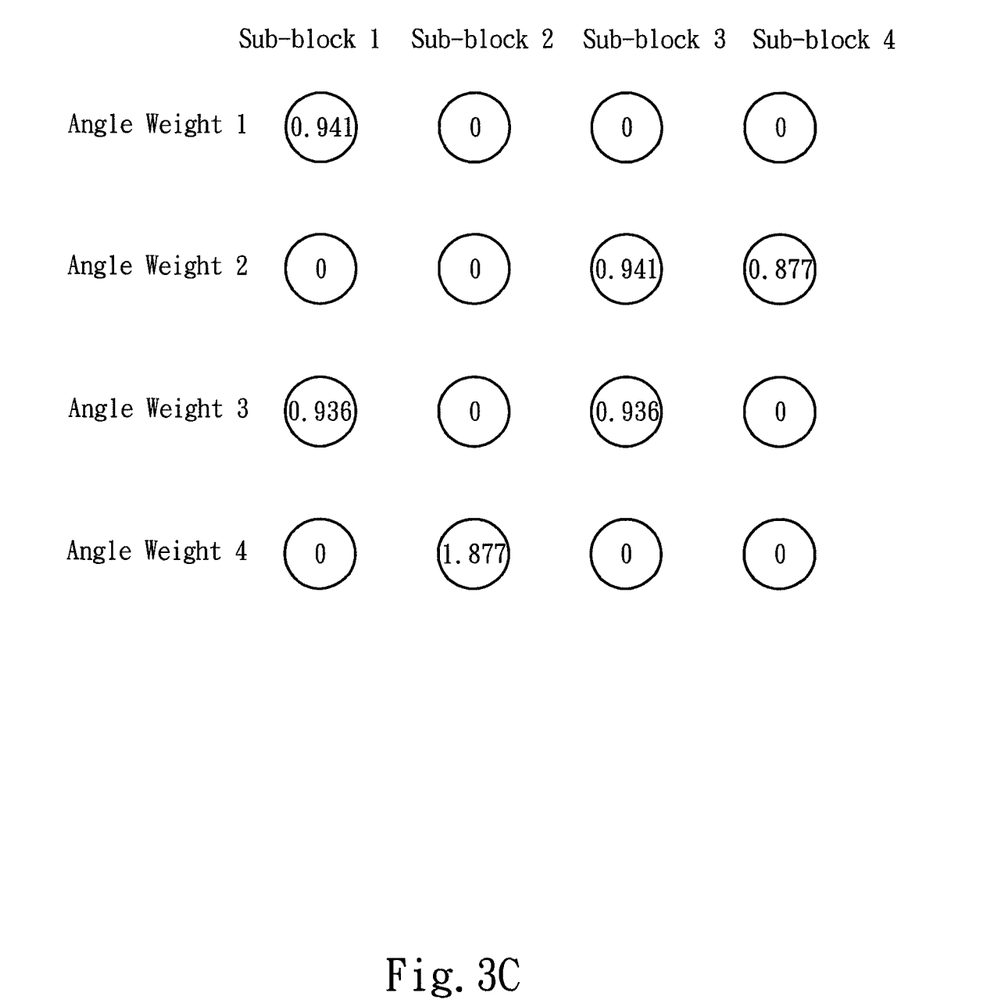
FIG. 3C is a schematic view of a second time of updating heuristic values in accordance with a preferred embodiment of the present invention.
Figure 3D:
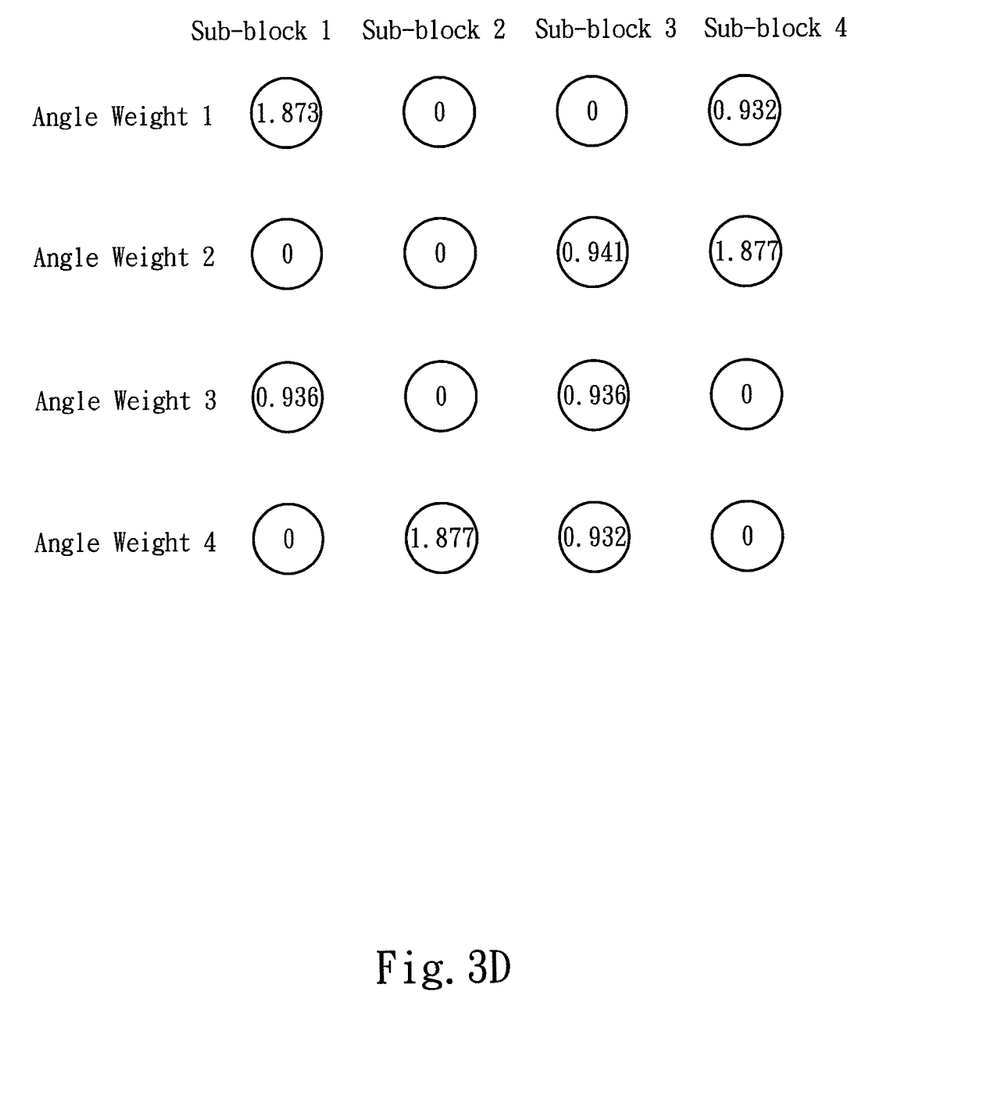
FIG. 3D is a schematic view of a third time of updating heuristic values in accordance with a preferred embodiment of the present invention.

With reference to FIG. 3A, four sub-blocks (i=4) and four angle weights (j=4) are adopted in this preferred embodiment, the heuristic value ($\eta_{ij}$) in terms of the quantity of sub-blocks (i) and the quantity of angle weights (j) is shown in FIG. 3A, assumed that the values of the peak power f (b) are sorted and used for calculating the heuristic value ($\eta_{ij}$). For example, three optima are updated, and the heuristic value ($\eta_{ij}$) is produced according to a path passing through these optima. With reference to FIGS. 3B, 3C and 3D for the way of calculating the heuristic value ($\mathfrak{y}_{ij}$), each peak power is calculated and the values of the peak power are sorted and used for updating the heuristic value ($\mathfrak{y}_{ij}$). After the three solutions are updated, a complete heuristic value ($\mathfrak{y}_{ij}$) is obtained. To allow each sub-block to have a chance to be selected, the calculated heuristic values ($\mathfrak{y}_{ij}$) plus a value greater than 0. In this preferred embodiment, all of the heuristic values ($\mathfrak{y}_{ij}$) plus 2 which implies that the block of the heuristic value ($\mathfrak{y}_{ij}$) equal to zero becomes 2, but the probability of selecting a path is still smaller than the probability for the path to pass through the aforementioned optima.

Figure 4:
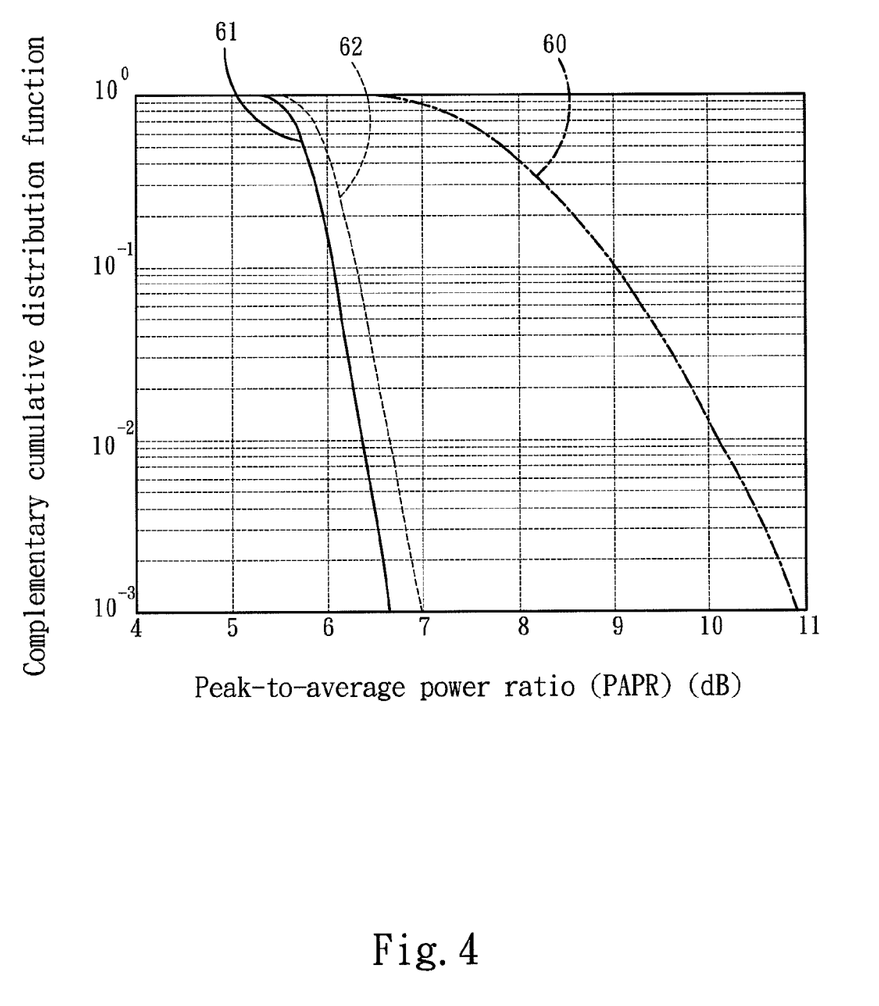
FIG. 4 is a schematic graph of comparing the result of a five-time iterations of a preferred embodiment of the present invention with a conventional technique.
Figure 5:
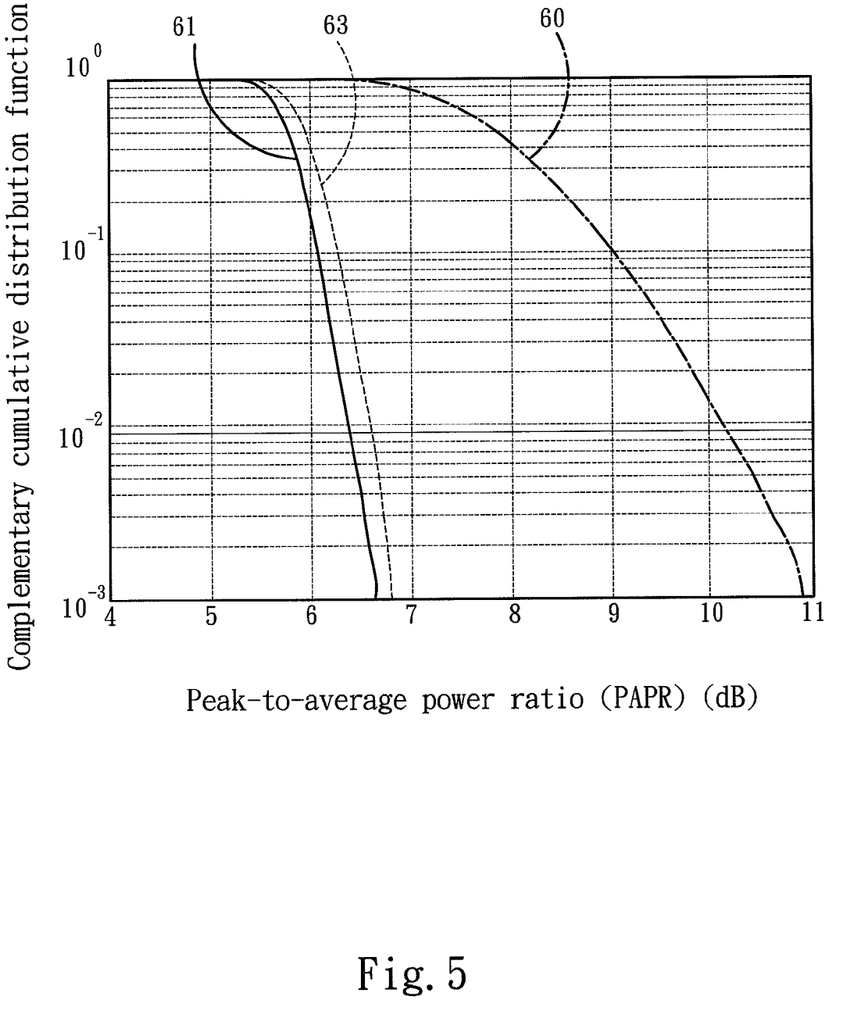
FIG. 5 is a schematic graph of comparing the result of a ten-time iterations of a preferred embodiment of the present invention with a conventional technique.

With reference to FIGS. 4 and 5 for schematic graphs of comparing the optima and original signals of a five-time iterations (t=5) and a ten-time iterations (t=10) of a preferred embodiment of the present invention with a conventional PTS method respectively, the preferred embodiment simulates that the quantity of ants (k) equal to 200 produces a number of uniformly distributed solutions R=200 of the heuristic values ($\mathfrak{y}_{ij}$), and α and β (α=0.8, β=1.8) represent the values for adjusting specific weights of the pheromone value ($\tau_{ij}$) and the heuristic value ($\mathfrak{y}_{ij}$) on a path respectively, and the decay rate ρ of the updated pheromone value ($\mathfrak{y}_{ij}$) is equal to 0.9. FIG. 4 shows that a result of using the five-time iterations 62 in the present invention significantly improves the PAPR value of the original signal 60. FIG. 4 shows that a result of using the ten-time iterations 63 is better than the result of using the five-time iterations 62 and closer to a best solution of the PTS method 61. With reference to Table 2 for a comparison table between the results obtained by the present invention and the best solution of the PTS method, the level of complexity of the computation in accordance with present invention, regardless of using the five-time iterations 62 or the ten-time iterations 63, is much lower than the best solution of the PTS method 61, but the PAPR value only has a difference of 0.15 dB from the best solution of the PTS method 61 (in the situation of using the ten-time iterations).

TABLE 2

Comparison table between the best solution of the PTS method and the results obtained by the present invention, and the level of complexity of the PTS method and the present invention

| | Level of complexity of computation | PAPR value (dB) |
|---|---|---|
| the PTS method | $j^{i-1}$<br>$4^{8-1}$ = 16384 | 6.65 dB |
| the present invention (t = 5) | R + k · t<br>200 + 200 · 5 = 1200 | 6.97 dB |
| the present invention (t = 10) | R + k · t<br>200 + 200 · 10 = 2200 | 6.8 dB |

In summation of the description above, the simulation result of the present invention has a value having a difference of only 0.15 dB from the best solution obtained from the PTS method of the conventional technique 61 of the, but the number of angle findings of the present invention is less than 7.5 times of the PTS method. To overcome the large number of computations of the PTS method, the present invention can reduce the number of times of findings and computations to obtain the optimum of a higher probability in order to avoid the large area of the computing circuit caused by the complicated computation, and provide a high performance.

What is claimed is:

1. A peak-to-average power ratio reduction method for an orthogonal frequency division multiplexing system based on path finding, and the method using an ant colony optimization algorithm together with a partial transmit sequence to reduce a peak-to-average power ratio value, simplifying a complexity of a computation of a computing circuit, and reducing an area of the computing circuit, and the method comprising the steps of:
   S1: using a parameter setting unit for performing a parameter setup to set a quantity of sub-blocks (i) and a quantity of angle weights (j), a quantity of ants (k) and a number of iterations (t), wherein the quantity of sub-blocks (i) and the quantity of angle weights (j) are combined to form a matrix which represents different selected paths;
   S2: building a heuristic value generating unit, and the heuristic value generating unit generate a heuristic value $\mathfrak{y}_{ij}$ according to a peak power f(b);
   S3: setting a pheromone unit, and setting a pheromone value ($\tau_{ij}$), wherein the pheromone value ($\tau_{ij}$) represents a path selection rate;
   S4: calculating a probability ($P_{ij}(t)$) for an ant to select each of the different selected path by a computing unit according to an equation of;

$$P_{ij}(t) = \frac{[\tau_{ij}(t)]^\alpha \times [\mathfrak{y}_{ij}]^\beta}{\sum_{l \in allowed_k} [\tau_{il}(t)]^\alpha \times [\mathfrak{y}_{il}]^\beta}$$

where, λ represents the angle weight that the $k^{th}$ ant has not selected yet, α and β represent values for adjusting the pheromone value ($\tau_{ij}$) and the heuristic value ($\mathfrak{y}_{ij}$) respectively;
   S5: updating the pheromone value ($\tau_{ij}$);
   S6: performing an iteration by repeating the steps S3 and S4, until the number of iterations is finished; and
   S7: obtaining a probability table of the different selected paths.

2. The peak-to-average power ratio reduction method for an orthogonal frequency division multiplexing system based on path finding as recited in claim 1, wherein the heuristic value ($\mathfrak{y}_{ij}$) is calculated by an equation of $\mathfrak{y}_{ij}=1/\exp(f(b)_1)$.

3. The peak-to-average power ratio reduction method for an orthogonal frequency division multiplexing system based on path finding as recited in claim 1, wherein the pheromone value ($\tau_{ij}$) is updated by an equation of $\tau_{ij}(t+n)=\rho\times\tau_{ij}(t)+\Delta\tau_{ij}$, and ρ in the equation is a decay rate of the pheromone value ($\tau_{ij}$) and $\Delta\tau_{ij}$ is the quantity of pheromone remained by all ants on the same path during a period that the iteration is performed from t to t+n.

4. The peak-to-average power ratio reduction method for an orthogonal frequency division multiplexing system based on path finding as recited in claim 3, wherein the decay rate ρ of the pheromone value ($\tau_{ij}$) has a setting condition of $0 \leq \rho \leq 1$.

5. The peak-to-average power ratio reduction method for an orthogonal frequency division multiplexing system based on path finding as recited in claim 1, wherein the heuristic value ($\mathfrak{y}_{ij}$) generated by the heuristic value generating unit is not equal to zero, so as to avoid that certain sub-blocks cannot be selected due to a zero heuristic value ($\mathfrak{y}_{ij}$).

6. The peak-to-average power ratio reduction method for an orthogonal frequency division multiplexing system based on path finding as recited in claim 5, wherein the heuristic value ($\mathfrak{y}_{ij}$) generated by the heuristic value generating unit is equal to a sum of a calculated heuristic value and a value greater than zero.

* * * * *